Figure 1:
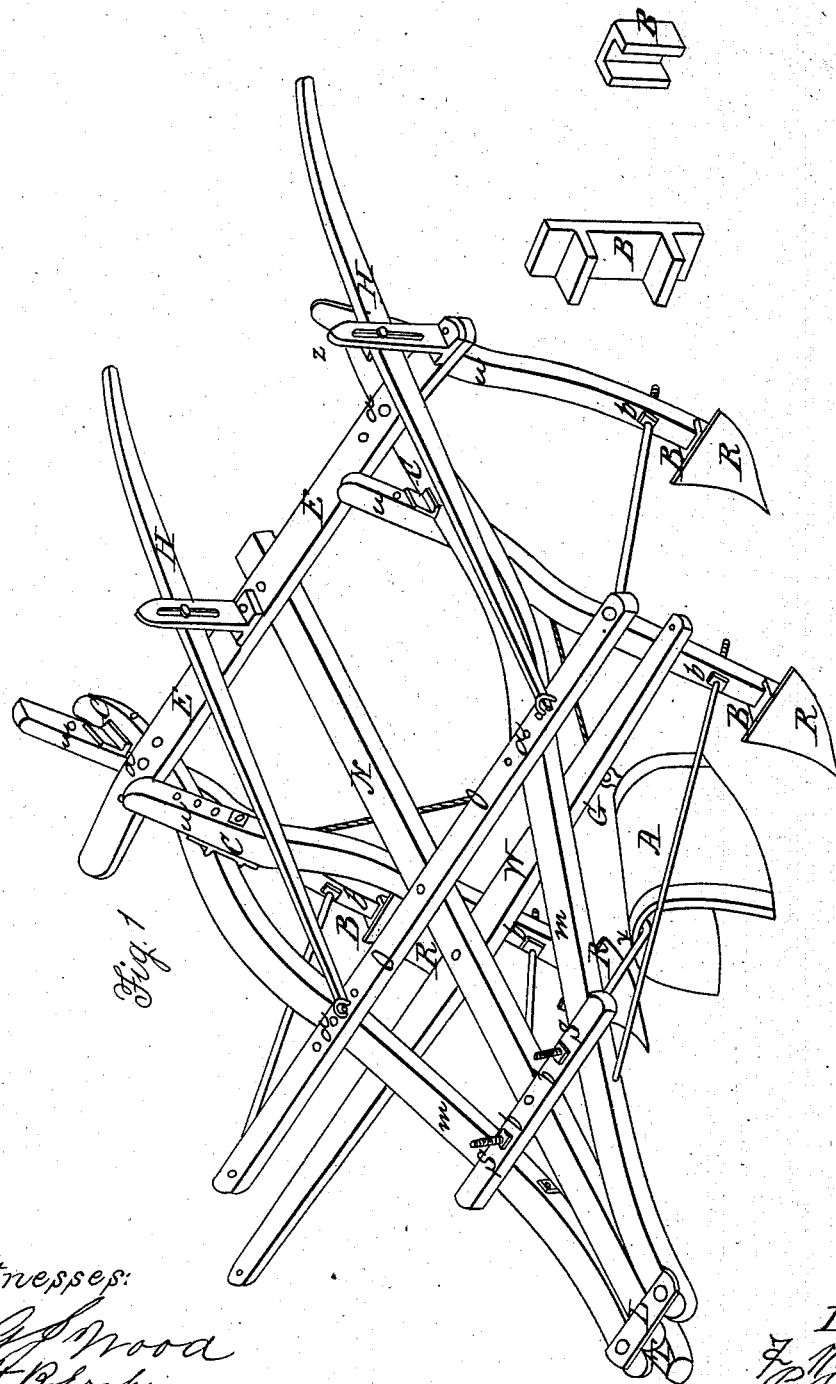

F. & P. A. MISNER.
Cultivator.

No. 26,695.

Patented Jan. 3. 1860

Witnesses:
G. S. Wood
H. Blackum

Inventor:
F. Misner
P. A. Misner

UNITED STATES PATENT OFFICE.

F. MISNER AND P. A. MISNER, OF FOX, ILLINOIS.

IMPROVEMENT IN CULTIVATORS.

Specification forming part of Letters Patent No. 26,695, dated January 3, 1860.

*To all whom it may concern:*

Be it known that we, F. MISNER and P. A. MISNER, of Fox, in the county of Kendall and State of Illinois, have invented a new and useful Improvement in Cultivators; and we do hereby declare that the following is a full, clear, and exact description of the same, reference being had to the accompanying drawings, forming a part of this specification, in which—

Figure 1 is a perspective view of a cultivator constructed after our invention. Figs. 2 and 3 are detached views of the castings for sustaining the shovels and standards.

Similar letters of reference in each of the several figures indicate corresponding parts.

Our invention consists in the arrangement of the several parts constituting the cultivator, in the manner and for the purpose hereinafter described.

To enable others skilled in the art to make and use my invention, I will proceed to describe its construction and operation.

The frame of our cultivator is of V shape. Its beam or central piece, n, is fixed, while its side pieces or wings are pivoted at their front ends to a plate, L, of the beam, and secured near their rear ends by means of pins to transverse pieces or timbers E O of the beam, said timbers having adjusting-holes a, so that the wings may be set farther out from or nearer to the beam, as the necessity of the case may require.

u u are the legs or standards on which the shovels R R are arranged. These standards are set on the inside and outside of the side pieces or wings, which are bent or curved in a wave-line, so as to cause the shovels to stand the proper distance apart. The shovels are combined with the standards by means of metal castings B and pivot-bolts g, and the standards with the wings by means of metal castings C, as shown. b b are brace-rods between the standards, the transverse timbers O, and wings m m. These rods have a screw-thread and set-nut, by which the standards, with the shovels of each wing, may be adjusted on the pivot-bolts g, so as to have their points elevated or depressed at pleasure, and thus caused to throw more or less soil toward the corn.

H H are the handles. They are arranged slightly diagonal to the frame, being hinged to the transverse piece O, and attached to slotted standards Z Z by means of set-screws. Thus arranging the handles allows of their being adjusted to suit different heights of persons and of the operator walking in the furrow made by the shovels of one wing.

A is a semicircular or arch-shaped shield, arranged under the beam and midway between the first pair of shovels. This shield overhangs the young corn, and thus protects it from being injured by lumps or clods, &c. It is suspended by means of a forked strap or chain, G, at its rear end, and at its front end by a forked-rod, X, the prongs of said rod passing up through the transverse piece S S of the beam, and having screw-threads b' b' cut on them so that they may receive set-nuts. By thus arranging the protector it can be adjusted to suit th height of the corn.

W is the whiffletree. It is arranged on the beam so as to allow of a horse being attached on each side of the tongue T, as shown.

The cultivator passes over the row of corn, the shovels of one wing standing on one side of the row and those of the other wing on the other side. Consequently both sides of the row of corn are worked at one operation.

What we claim as our invention, and desire to secure by Letters Patent, is—

The arrangement of the beam n, wings m, transverse pieces E O, handles H, slotted standards Z, legs u, shovels R, castings C B brace-rods b, forked strap G, forked rod X and transverse timber S, the whole being con structed and used together in the manner and for the purpose herein described.

F. MISNER.
P. A. MISNER.

Witnesses:
G. YORKE AT LEE,
G. DIETERICH.